(12) United States Patent  (10) Patent No.: US 8,690,622 B2
Pearson et al.  (45) Date of Patent: Apr. 8, 2014

(54) SMALL SIZE FLOATING VESSEL USING A DUAL FUEL SYSTEM

(75) Inventors: Ronald C. Pearson, Houston, TX (US); Michael T. Carroll, Houston, TX (US)

(73) Assignee: STX US Marine, Inc., Houston, TX (US)

( * ) Notice: Subject to any disclaimer, the term of this patent is extended or adjusted under 35 U.S.C. 154(b) by 350 days.

(21) Appl. No.: 13/231,742

(22) Filed: Sep. 13, 2011

(65) Prior Publication Data

US 2013/0065461 A1  Mar. 14, 2013

(51) Int. Cl.
 B63H 21/21 (2006.01)
(52) U.S. Cl.
 USPC ............................................. 440/88 F; 440/6
(58) Field of Classification Search
 CPC ..... Y02T 70/5218; B63H 21/17; B63H 21/20
 USPC .......... 701/21; 440/1, 2, 6, 88 F; 123/27 GE, 123/575; 114/72, 74 R
 See application file for complete search history.

(56) References Cited

U.S. PATENT DOCUMENTS

| 6,095,101 | A | * | 8/2000 | Pedersen | 123/27 GE |
| 6,142,179 | A | * | 11/2000 | Bjornsson et al. | 137/565.37 |
| 2012/0108116 | A1 | * | 5/2012 | Takahira et al. | 440/6 |
| 2012/0252285 | A1 | * | 10/2012 | Lee et al. | 440/3 |

* cited by examiner

*Primary Examiner* — Edwin Swinehart
(74) *Attorney, Agent, or Firm* — Buskop Law Group, PC; Wendy Buskop

(57) ABSTRACT

A small size floating vessel having a dual fuel system, optimized cargo capacity, and options for selectively operating on diesel fuel and natural gas for maximizing the range of vessel operation and reducing vessel emissions of nitrogen oxides and particulates.

20 Claims, 7 Drawing Sheets

*FIGURE 7*

|  | 60 METER VESSEL | 90 METER VESSEL | 170 METER VESSEL |
|---|---|---|---|
| ABOVE DECK DIESEL FUEL CAPACITY | $50m^3$ | $75m^3$ | $100m^3$ |
| BELOW DECK DIESEL FUEL CAPACITY | $50m^3 - 350m^3$ | $100m^3 - 925m^3$ | $200m^3 - 1900m^3$ |
| BELOW DECK NATURAL GAS CAPACITY | $50m^3 - 100m^3$ | $50m^3 - 800m^3$ | $100m^3 - 1200m^3$ |
| SUPERSTRUCTURE NATURAL GAS CAPACITY | $50m^3 - 100m^3$ | $50m^3 - 100m^3$ | $200m^3 - 300m^3$ |

SMALL SIZE FLOATING VESSEL USING A DUAL FUEL SYSTEM

FIELD

The present embodiments generally relate to a small size self-propelled floating vessel having an on-board dual fuel system, azimuthing thrusters, and an overall length ranging from sixty meters to one hundred seventy meters.

BACKGROUND

A need exists for a floating vessel with a lower emissions profile than vessels that only operate on diesel fuel.

A further need exists for a floating vessel that is adaptable to operate on different fuel supplies, thereby operating with reduced fuel costs and reduced emissions.

A further need exists for a floating vessel that can continue to operate in areas where natural gas is scarce.

A further need exists for a floating vessel that can operate in emission sensitive areas, such as the Arctic Ocean and eastern portions of the Gulf of Mexico.

A further need exists for a floating vessel that can operate on inexpensive diesel fuel in areas where emissions are not restricted, and can convert to operating on natural gas within a few minutes to provide low emissions, which can be used in areas such as the Beaufort Sea, Chukchi Sea, and other coastal zones where emissions of nitrogen oxides and particulates is controlled.

A further need exists for a floating vessel that has a smaller emissions footprint, allowing the floating vessel to operate within a twenty five mile range of a drill site without increasing an overall emissions profile of the drill site.

The present embodiments meet these needs.

BRIEF DESCRIPTION OF THE DRAWINGS

The detailed description will be better understood in conjunction with the accompanying drawings as follows:

FIG. 7 depicts a chart showing fuel capacity for different embodiments of the floating vessel according to one or more embodiments.

Figure 1:
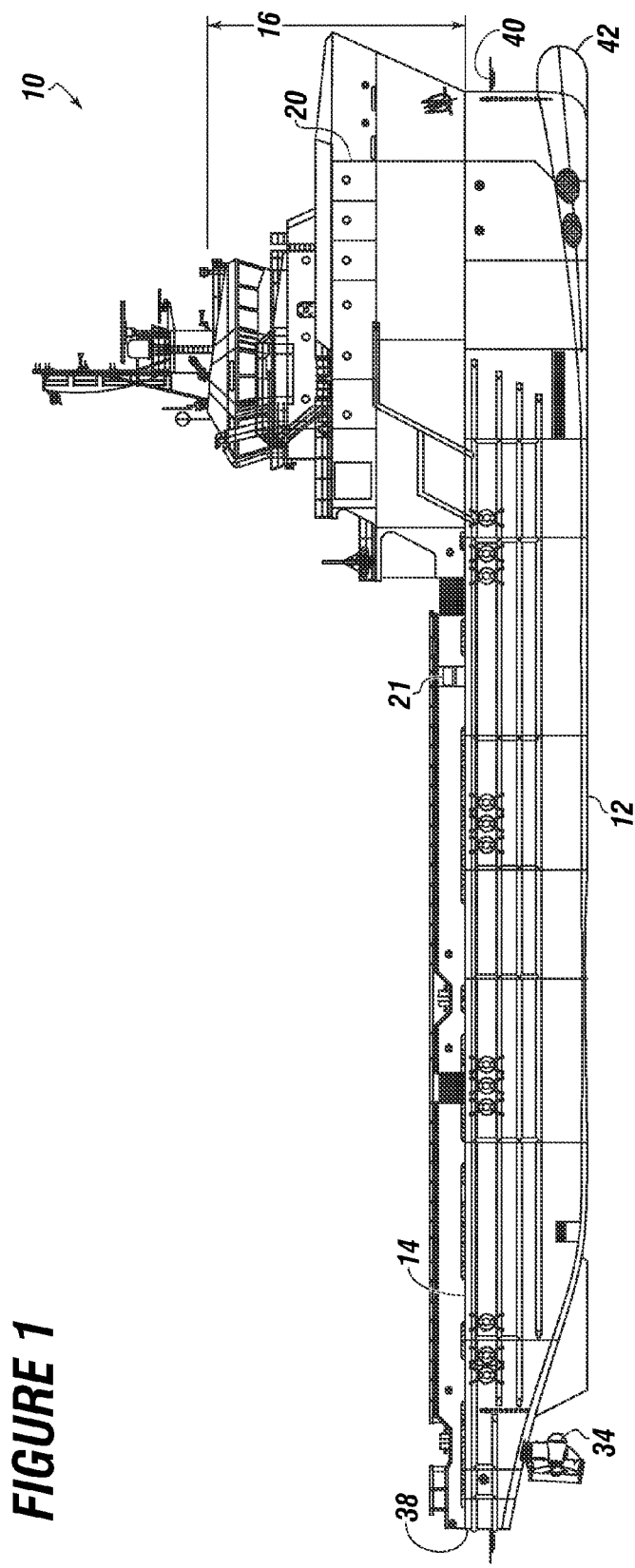
FIG. 1 depicts an outboard profile of the floating vessel according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a floating vessel using a dual fuel system, which can include diesel fuel and natural gas.

The floating vessel can be a small size floating vessel. For example, the floating vessel can be an offshore supply vessel for servicing and resupplying offshore drilling facilities.

The floating vessel can have options for selectively operating on either diesel fuel or natural gas. Selective operation on diesel fuel or natural gas can allow a captain of the floating vessel to maximize the range of vessel operation where possible, and to operate with reduced vessel emissions of nitrogen oxides and particulates where required.

For example, the floating vessel can operate on natural gas to provide for lower emissions, such as when the floating vessel enters reduced emission zones. The floating vessel can convert to operating on diesel fuel to maximize the operating range and flexibility of the floating vessel, such as when the floating vessel is outside of the reduced emission zones. The reduced emission zones can be areas where governmental regulations require reduced emissions from the floating vessel.

The floating vessel can have an optimized cargo capacity that, for a given range, can carry more cargo than other conventional supply vessels.

The floating vessel can have a hull with port and starboard sides, bow, and stern.

The hull can be a monohull or a catamaran hull supported on two pontoons. The monohull can have a full load displacement of up to about 32,000 metric tonnes. The monohull can have an overall length ranging from about 60 meters to about 170 meters, and a draft up to about 10 meters.

In one or more embodiments, the hull can have a hull speed ranging from about 11 knots to about 17 knots.

The stern can be tapered, and can rise from a waterline of the floating vessel. The hull can also have a bulbous bow, which can increase fuel efficiency of the floating vessel.

A deck also referred to as the main deck, can be disposed over the hull. The deck can be made of steel, and have a thickness ranging from about 9.5 millimeters to about 12 millimeters.

A superstructure can be formed or disposed over the deck. The superstructure can be a single or multi-level structure having a pilot house, which can contain a navigation system.

The superstructure can have one or more crew quarters, which can be disposed on a first and/or second level of the superstructure. The crew quarters can provide an area for the crew to sleep, eat, engage in personal hygiene, and the like. For example, the crew quarters can have a vacuum flush toilet, related sanitation systems, and the like.

The superstructure can include cooking facilities, storage for food, gear, and other materials.

Potable drinking water tanks and reverse osmosis equipment for providing drinking water to the crew can be disposed below the deck.

The superstructure can support a minimum of a life raft/lifeboat from davits as required by regulations.

The hull can support a bunkering station, which can be disposed above or below the deck. The bunkering station can be used to bunker diesel fuel and natural gas for use in powering the floating vessel.

The floating vessel can have at least one natural gas tank, which can be connected to the bunkering station and can contain natural gas for powering the floating vessel.

The natural gas can be liquefied natural gas or compressed natural gas.

The natural gas can be maintained at a pressure ranging from about 1 atmosphere to about 11 atmospheres, and a temperature ranging from about −180 degrees Celsius to about −150 degrees Celsius.

The at least one natural gas tank can be disposed within the superstructure and above the deck, beneath the deck, or beneath the deck and beneath the superstructure. The volume of the natural gas tank can range from about 100 cubic meters to about 1200 cubic meters.

The floating vessel can include a plurality of diesel fuel storage tanks, which can be mounted below the deck and connected to the bunkering station. The diesel fuel storage tanks can be used to store diesel fuel. The volume of the diesel fuel storage tanks can range from about 50 cubic meters to about 1900 cubic meters.

The floating vessel can include a plurality of diesel fuel day tanks, which can contain diesel fuel. The diesel fuel day tanks can be mounted above the deck and connected to the diesel fuel storage tanks. The volume of the diesel fuel day tanks can range from about 50 cubic meters to about 100 cubic meters.

The diesel fuel can be marine diesel fuel, which can be in compliance with the fuel standards of the United States, such as ASTM D975 as of the year 2011, ASTM D2069 as of the year 1998, and international standards, such as ISO 8217 as of the year 2010.

The floating vessel can have a propulsion system, which can be connected to the diesel fuel day tanks and the navigation system.

The propulsion system can be adapted to selectively switch between receiving natural gas from the at least one natural gas tank and receiving diesel fuel from the diesel fuel day tanks. For example, in one or more embodiments, the propulsion system can selectively switch between receiving natural gas from the at least one natural gas tank and receiving diesel fuel from the diesel fuel day tanks in less than 3 minutes.

The propulsion system can include at least one dual fuel engine disposed on the deck, at least one electrical power supply disposed on the deck and connected to the at least one duel fuel engine, power transmission equipment connected to each electrical power supply, and at least one azimuthing thruster extending through the hull and powered by the power transmission equipment.

In one or more embodiments, the floating vessel can have from about three to about six electrical power supplies connected with about three to about six dual fuel engines.

Having the duel fuel engine located on or above the deck can allow the floating vessel to maximize cargo capacity within the hull.

One or more embodiments of the floating vessel can have a global positioning system connected to the navigation system. A processor with a data storage can be connected to the global positioning system.

The data storage can have computer instructions to compare an actual location of the small size floating vessel as determined by the global positioning system to stored locations where emissions must be reduced, and to generate at least one alarm when the actual location is at a stored location where emissions must be reduced.

For example, if the comparison shows that the floating vessel is about to enter one of the locations where emissions must be reduced the processor and the data storage can generate the alarm.

The data storage can have computer instructions to transmit the alarm to a client device to advise a captain to switch from diesel fuel to natural gas to minimize vessel emissions.

In one or more embodiments, the floating vessel can have a dynamic positioning system connected to the global positioning system, a laser reference system, an acoustic reference systems, or combinations thereof. The dynamic positioning system can provide commands to the propulsion system to maintain the floating vessel at one location, one heading, or combinations thereof in response to weather and current.

Turning now to the Figures, FIG. 1 depicts an embodiment of an outboard profile of the floating vessel 10 according to one or more embodiments.

One or more embodiments of the floating vessel 10 can have an overall length of about 302 feet and a beam of about 64 feet.

The floating vessel 10 can have a hull 12. In one or more embodiments, the hull 12 can have a depth of about 24 feet and 6 inches, and a loadline draft of about 19 feet and 6 inches.

The hull 12 can have a waterline 40 and a bulbous bow 42 for increasing fuel efficiency.

The floating vessel 10 can have a stern 38 and at least one azimuthing thruster 34. The stern 38 can rise from a keel of the floating vessel 10 while maintaining at least a portion of the stern 38 below the waterline 40.

The floating vessel 10 can have a deck 14 disposed over the hull 12.

The floating vessel 10 can have a superstructure 16 with a top deck for housing crew quarters 20.

The floating vessel 10 can have a bunkering station 21 external to the superstructure 16.

In one or more embodiments, the superstructure 16 can have a main deck disposed at about 24 feet and 6 inches from the keel, a focsle deck disposed at about 41 feet and 5 inches above the keel, a first deck "01 deck" at about 50 feet above the keel, an electronics deck at about 59 feet above the keel, a void deck at about 63 feet above the keel, a pilothouse top deck at about 72 feet above the keel, and a mast base at about 80 feet above the keel.

Figure 2A:
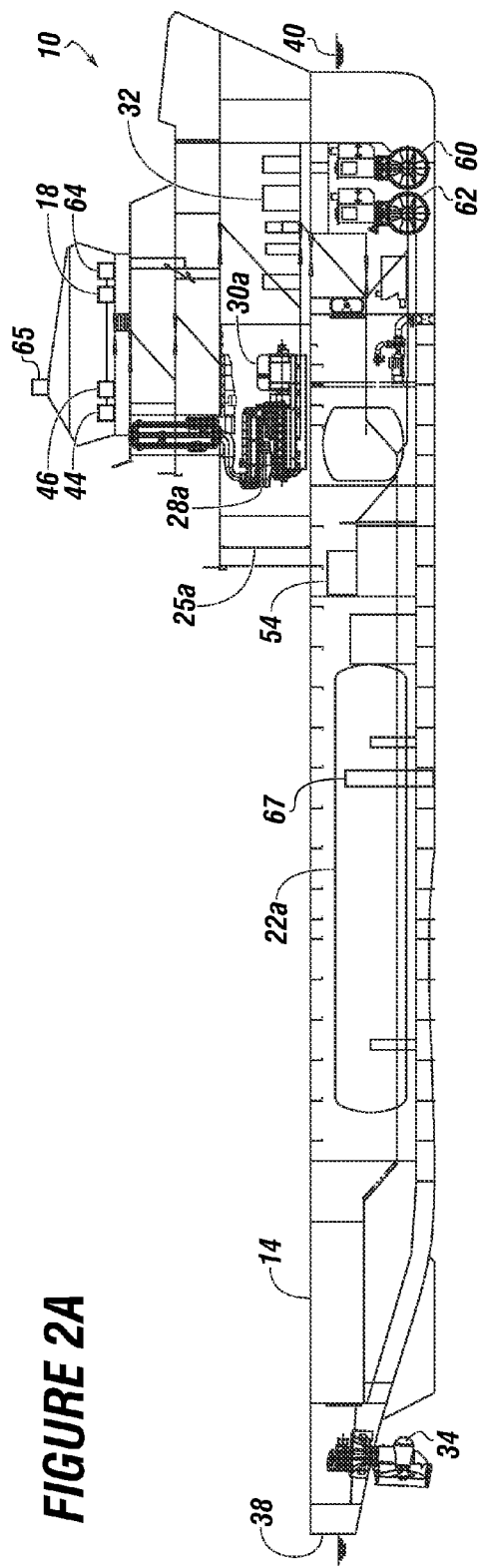
FIG. 2A depicts an inboard profile of the floating vessel with a natural gas tank below the deck according to one or more embodiments.
Figure 2B:
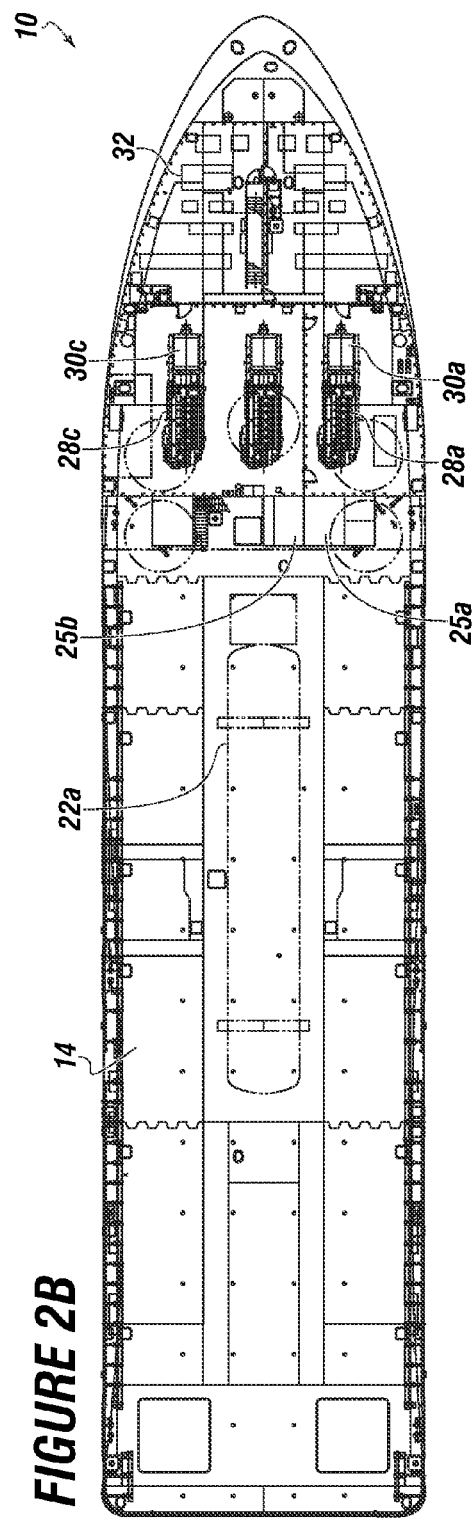
FIG. 2B depicts a main deck plan of the floating vessel of FIG. 2A according to one or more embodiments.

FIG. 2A depicts an inboard profile of the floating vessel 10 with a natural gas tank 22a disposed below the deck 14 without being directly below the superstructure, and FIG. 2B depicts a main deck plan of the floating vessel 10 of FIG. 2A.

The deck 14 can be configured to carry cargo.

The natural gas tank 22a can contain a liquefied natural gas for operating the floating vessel 10. The natural gas tank 22a can be disposed beneath the deck 14 and adjacent a bulk mud compressor 54, which can also be beneath the deck 14.

The floating vessel 10 can have power transmission equipment 32 disposed above the deck 14 and within the superstructure, such as between a main deck and foscle deck.

The floating vessel 10 can have diesel fuel day tanks 25a and 25b disposed above the deck 14 and within the superstructure.

The diesel fuel day tanks 25a and 25b can be disposed adjacent one or more dual fuel engines 28a and 28c, which can be connected to one or more electrical power supplies 30a and 30d disposed above a main deck.

The one or more dual fuel engines 28a and 28c can each be connected with one of the electrical power supplies 30a and 30c, such as a generator. For example, the electrical power supplies 30a and 30c can be Wartsila generators configured to produce 2510 kilowatts at 720 revolutions per minute. As such, the total kilowatts that can be produced by the electrical power supplies 30a and 30c can be 7530 kilowatts at 690 volts AC.

The power transmission equipment 32 can be power transmission equipment available from Wartsila of Finland, and can be configured to operate seamlessly with the electrical power supplies 30a and 30c and the propulsion system of the floating vessel 10.

In operation, the dual fuel engines 28a and 28c of the floating vessel 10 can selectively operate on liquefied natural gas from the natural gas tank 22a or on diesel fuel from the diesel fuel day tanks 25a and 25b.

In one or more embodiments, the floating vessel 10 can have tanks configured to contain about 585,000 gallons of water ballast, about 255,000 gallons of diesel fuel, about 67,000 gallons of liquefied natural gas, and about 17,000 gallons of fresh water.

The floating vessel 10 can be configured to carry about 14,870 barrels of liquid mud, about 1000 barrels of methanol, and about 10,250 cubic feet of dry bulk, such as drilling cement, as cargo.

One or more embodiments of the floating vessel 10 can include climate control equipment, which can be adjacent the power transmission equipment 32 and within the superstructure.

The navigation system 18 can be disposed within the pilothouse of the superstructure, and can be connected with the global positioning system 44.

A processor 46 and a dynamic positioning system 64 can also be connected with the global positioning system 44.

The dynamic positioning system 64 can be connected with a laser reference system 65 and a acoustic reference system 67 for holding the floating vessel 10 at one location, one heading, or combinations thereof.

The azimuthing thrusters 34 can be disposed proximate the stern 38 and below the waterline 40. For example, the azimuthing thrusters 34 can be ones available from Wartsilla. The azimuthing thrusters 34 can be connected to a portion of the propulsion system, such as, in a z-drive compartment adjacent the stern 38.

The azimuthing thrusters 34 can operate on 2700 kilowatts, 690 volt AC, at 1200 revolutions per minute to provide 7241 horsepower with a fixed pitch variable frequency drive in a nozzle.

The floating vessel 10 can also have twin bow thrusters 60 and 62 for positioning the floating vessel 10. The twin bow thrusters 60 and 62 can each provide 1280 kilowatts, 690 volt AC, at 890 revolutions per minutes for a total of 3433 horse power. The twin bow thrusters 60 and 62 can have a fixed pitch variable frequency drive with reversing motors.

In one or more embodiments, the floating vessel 10 can have one or more fire monitors configured for remote control.

Figure 3A:
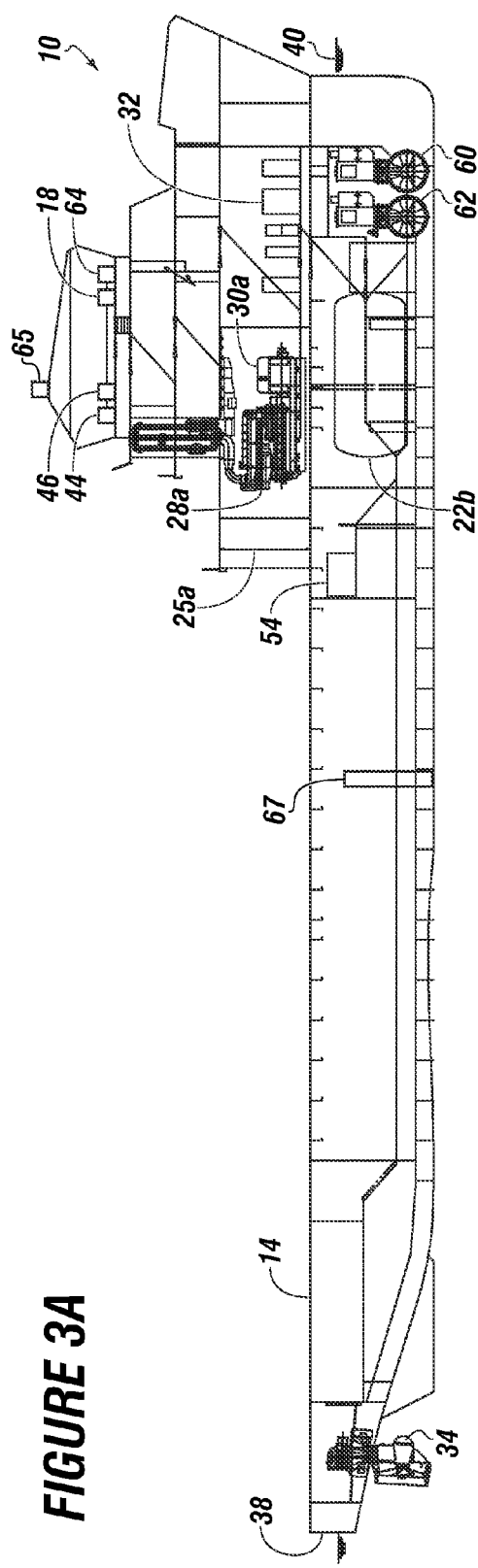
FIG. 3A depicts an inboard profile of the floating vessel with the natural gas tank below the deck and superstructure according to one or more embodiments.
Figure 3B:
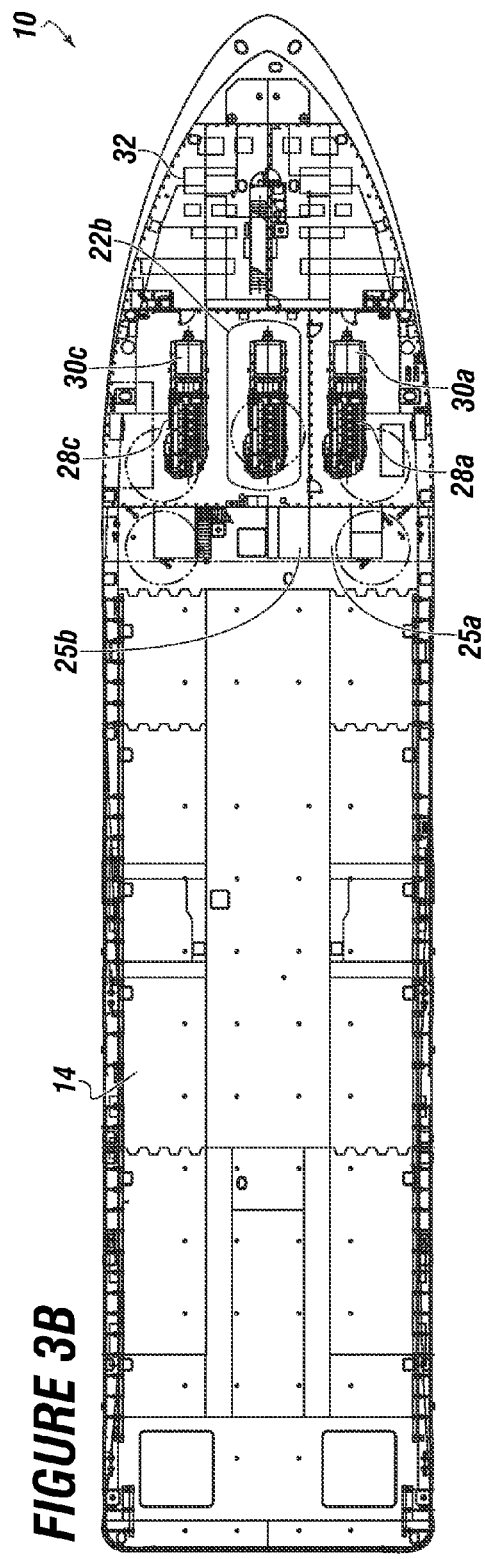
FIG. 3B depicts a main deck plan of the floating vessel of FIG. 3A according to one or more embodiments.

FIG. 3A depicts another embodiment of an inboard profile of the floating vessel 10, and FIG. 3B depicts a main deck plan of the floating vessel 10 of FIG. 3A.

The natural gas tank 22b can be disposed below the deck 14 and below the superstructure.

In one or more embodiments, the dynamic positioning system 64 can be connected with the laser reference system 65 and the acoustic reference system 67.

Figure 4A:
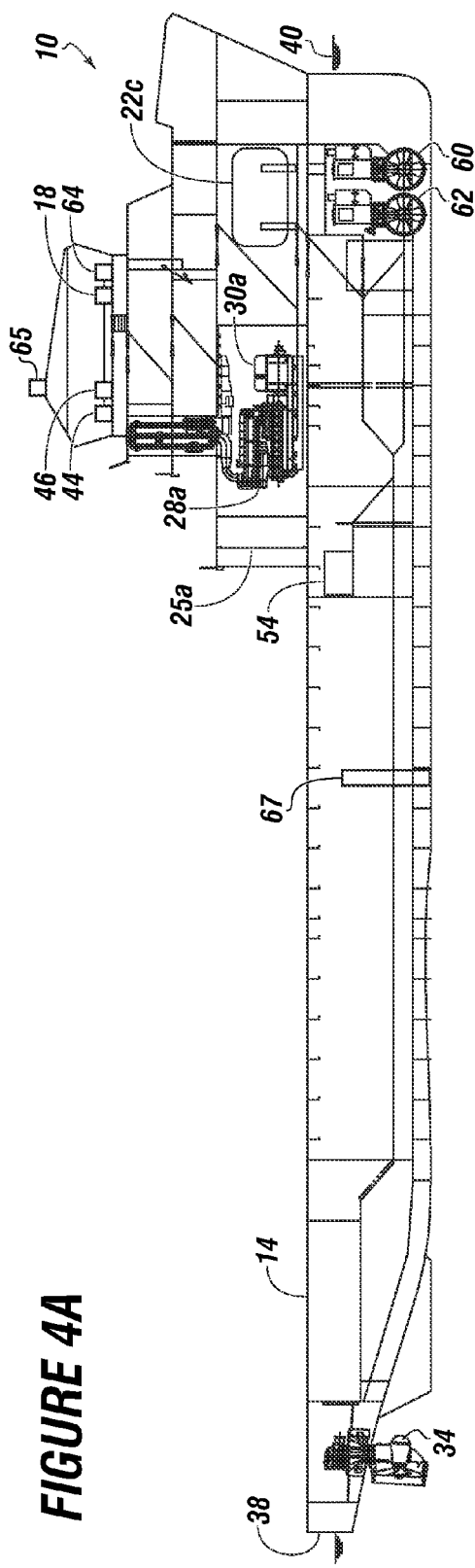
FIG. 4A depicts an inboard profile of the floating vessel with the natural gas tank within the superstructure according to one or more embodiments.
Figure 4B:
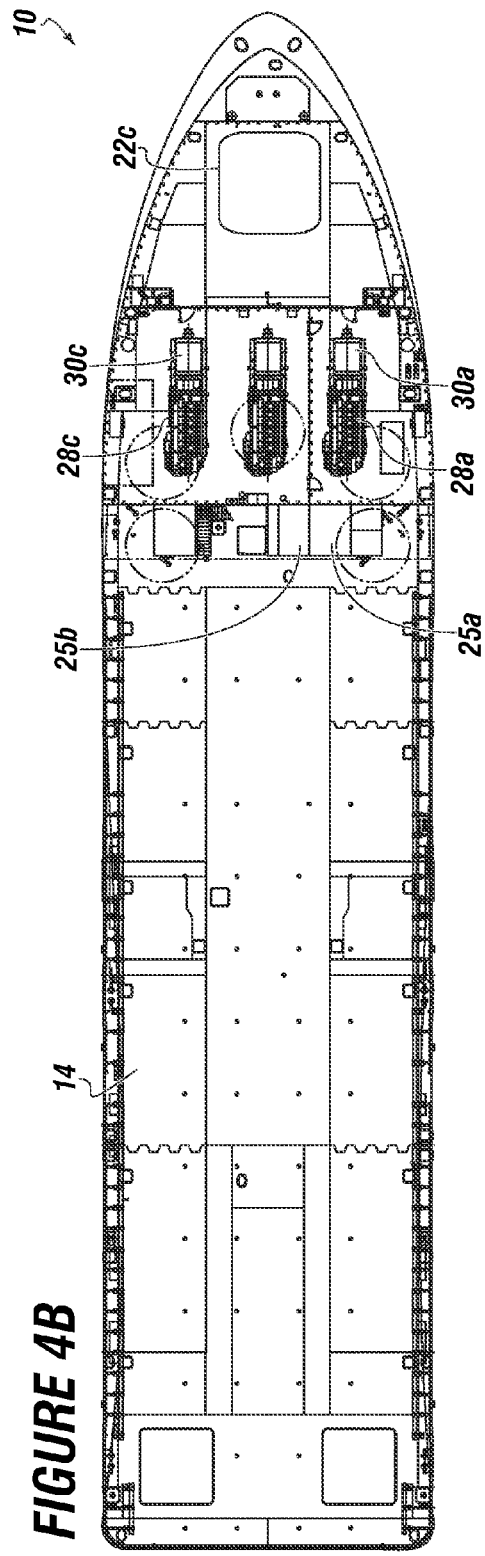
FIG. 4B depicts a main deck plan of the floating vessel of FIG. 4A according to one or more embodiments.

FIG. 4A depicts another embodiment of an inboard profile of the floating vessel 10, and FIG. 4B depicts a main deck plan of the floating vessel 10 of FIG. 4A.

The natural gas tank 22c can be disposed above the deck 14 and within the superstructure.

Figure 5:
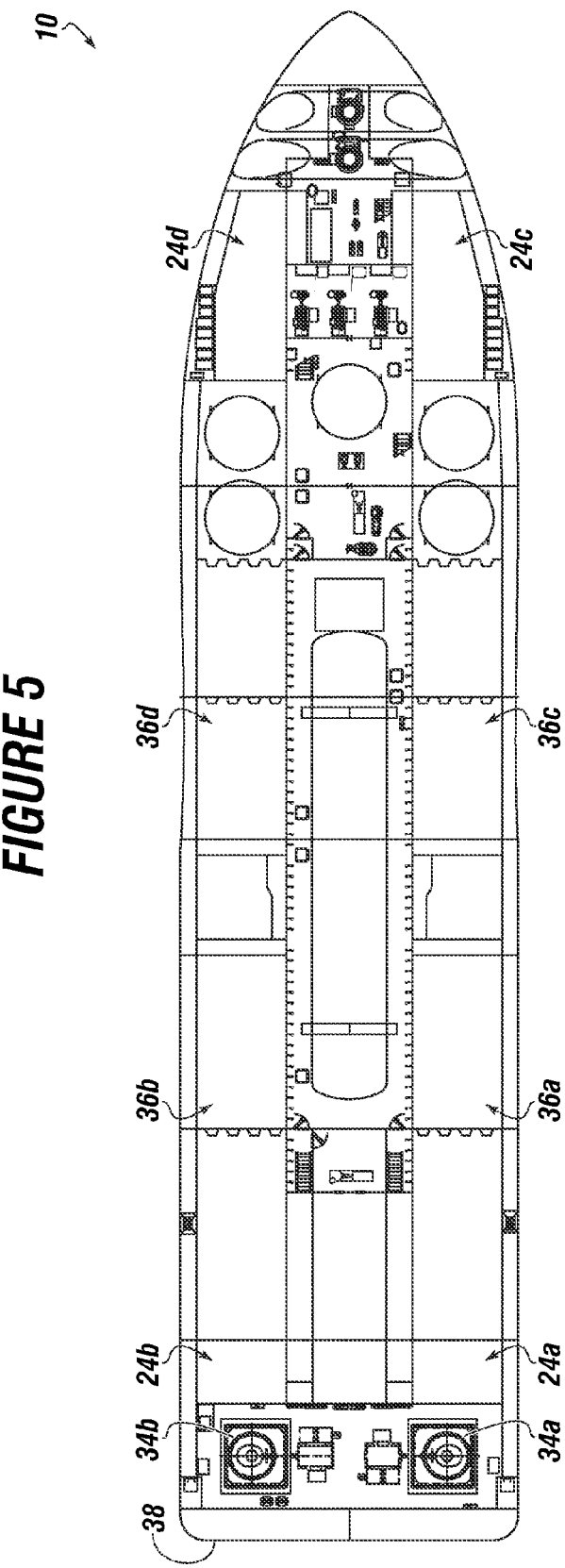
FIG. 5 depicts a hold plan of the floating vessel according to one or more embodiments.

FIG. 5 depicts a hold plan of the floating vessel 10, two azimuthing thrusters 34a and 34b proximate the stern 38.

The floating vessel 10 can have cargo space 36a, 36b, 36c, and 36d within the cargo hold.

The floating vessel 10 can have diesel fuel storage tanks 24a, 24b, 24c and 24d, which can connect to the bunkering station.

Figure 6:
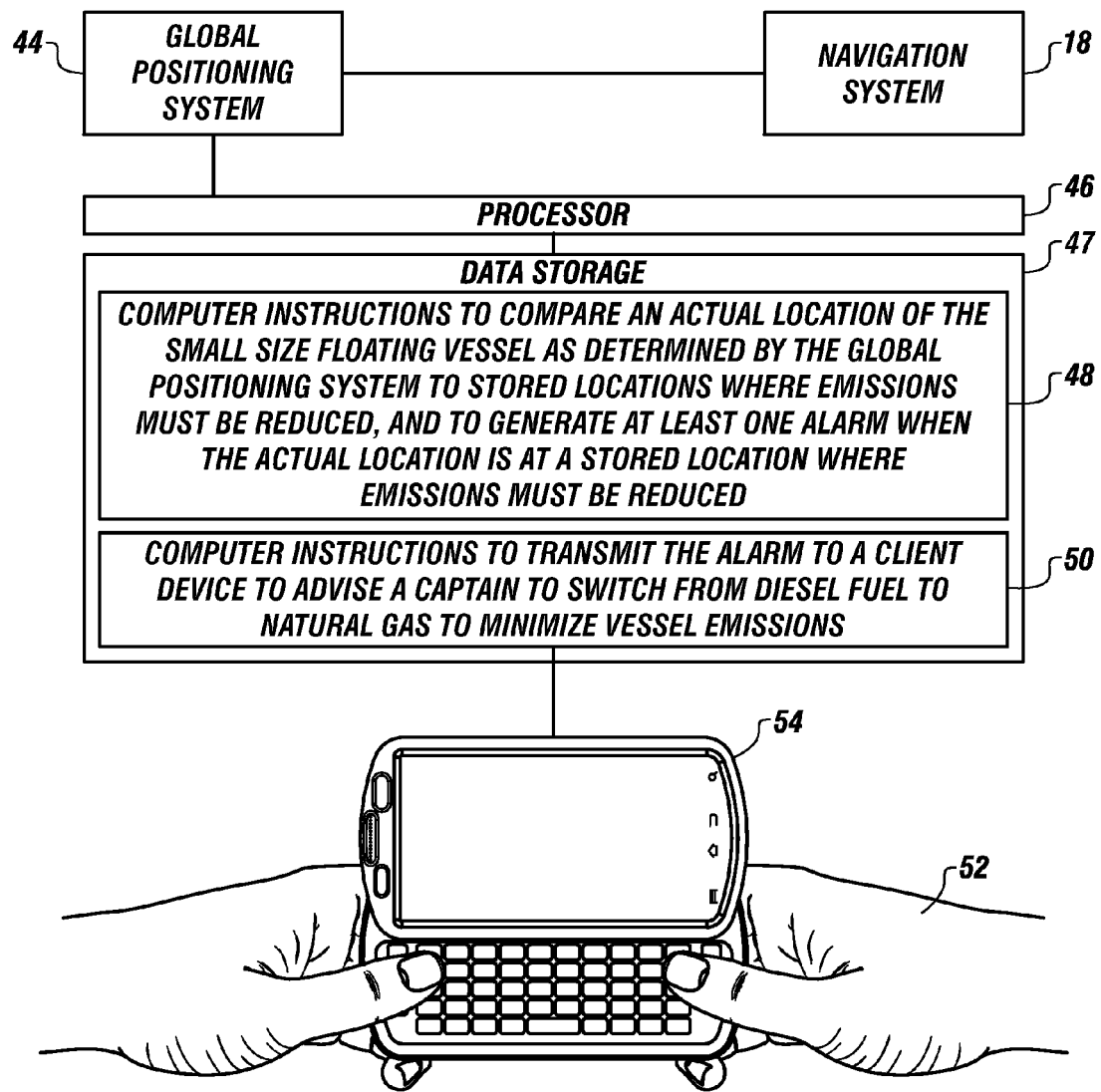
FIG. 6 depicts a diagram of an emission early warning alarm system usable with the floating vessel according to one or more embodiments.

FIG. 6 depicts an embodiment of an emission early warning alarm system usable with the floating vessel 10 according to one or more embodiments.

For example, the navigation system 18 can be in communication with the global positioning system 44.

The global positioning system 44 can be in communication with the processor 46, which can be in communication with a data storage 47.

The data storage 47 can be in communication with a client device 54. For example, a captain 52 of the floating vessel can have the client device 54 for monitoring the emission early warning alarm system.

The client device 54 can be any networked communication interface device, such as a laptop, cellular phone, or vessel alarm system.

The client device 54 can be provided with alerts or alarms from the data storage 47, such as through the global positioning system 44. For example, the navigation system 18 can provide the processor 46 and data storage 47 with navigation data to allow the processor 46 and data storage 47 to determine whether or not to initiate an alarm.

The data storage 47 can have computer instructions to compare an actual location of the small size floating vessel as determined by the global positioning system to stored locations where emissions must be reduced, and to generate at least one alarm when the actual location is at a stored location where emissions must be reduced 48.

For example, if the comparison shows that the floating vessel is about to enter one of the locations where emissions must be reduced the processor 46 and the data storage 47 can generate the alarm.

The data storage 47 can have computer instructions to transmit the alarm to a client device to advise a captain to switch from diesel fuel to natural gas to minimize vessel emissions 50.

As such, the floating vessel can selectively operate on diesel fuel or natural gas depending upon the location of the floating vessel as determined by the global positioning system 44 and the navigation system 18.

FIG. 7 depicts a chart showing fuel capacity of three floating vessels, including floating vessel 10a with an overall length of 60 meters, floating vessel 10b with an overall length of 90 meters, and floating vessel 10c with an overall length of 170 meters.

An above deck diesel fuel capacity 11a of the floating vessels 10a, 10b and 10c with the diesel fuel day tanks disposed above the deck is charted. For example, floating vessel 10a can have an above deck diesel fuel capacity of about 50 cubic meters with the diesel fuel day tanks disposed above the deck, floating vessel 10b can have an above deck diesel fuel capacity of about 75 cubic meters with the diesel fuel day tanks disposed above the deck, and floating vessel 10c can have an above deck diesel fuel capacity of about 100 cubic meters with the diesel fuel day tanks disposed above the deck.

A below deck diesel fuel capacity 11b of the floating vessels 10a, 10b and 10c with the diesel fuel day tanks disposed below the deck is charted. For example, the floating vessel 10a can have a below deck diesel fuel capacity ranging from about 50 cubic meters to about 350 cubic meters with the diesel fuel day tanks disposed below the deck, floating vessel 10b can have a below deck diesel fuel capacity ranging from about 100 cubic meters to about 925 cubic meters with the diesel fuel day tanks disposed below the deck, and floating vessel 10c can have a below deck diesel fuel capacity ranging from about 200 cubic meters to about 1900 cubic meters with the diesel fuel day tanks disposed below the deck.

A below deck natural gas capacity 13a of the floating vessels 10a, 10b and 10c with the natural gas tanks disposed below the deck is charted. For example, the floating vessel 10a can have a below deck natural gas capacity ranging from about 50 cubic meters to about 100 cubic meters with the natural gas tanks disposed below the deck, floating vessel 10b can have a below deck natural gas capacity ranging from about 50 cubic meters to about 800 cubic meters with the natural gas tanks disposed below the deck, and floating vessel 10c can have a below deck natural gas capacity ranging from about 100 cubic meters to about 1200 cubic meters with the natural gas tanks disposed below the deck.

A superstructure natural gas capacity 13b of the floating vessels 10a, 10b and 10c with the natural gas tanks disposed in the superstructure is charted. For example, the floating vessel 10a can have a superstructure natural gas capacity ranging from about 50 cubic meters to about 100 cubic meters with the natural gas tanks disposed in the superstructure, floating vessel 10b can have a superstructure natural gas capacity ranging from about 50 cubic meters to about 100 cubic meters with the natural gas tanks disposed in the superstructure, and floating vessel 10c can have a superstructure natural gas capacity ranging from about 200 cubic meters to about 300 cubic meters with the natural gas tanks disposed in the superstructure.

The fuel storage capacities of the floating vessels 10a, 10b and 10c can be configured to maximize the fuel range and economic range of the floating vessels 10a, 10b and 10c, while enabling the floating vessels 10a, 10b and 10c to provide for maximum cargo capacity.

Also, the ability to convert to using natural gas can provide for a reduction in emissions, such as in emission controlled coastal areas.

While these embodiments have been described with emphasis on the embodiments, it should be understood that within the scope of the appended claims, the embodiments might be practiced other than as specifically described herein.

What is claimed is:

1. A small size floating vessel having a dual fuel system, optimized cargo capacity, and options for operating selectively between diesel fuel and natural gas for maximizing economy of vessel operation and reducing vessel emissions of nitrogen oxides and particulates, wherein the small size floating vessel comprises:
   a. a hull having an overall length ranging from sixty meters to one hundred seventy meters and a draft of up to ten meters;
   b. a deck disposed over the hull;
   c. a superstructure disposed over the deck for providing a navigation system and crew quarters;
   d. a bunkering station disposed above or below the deck for bunkering natural gas and diesel fuel;
   e. at least one natural gas tank connected to the bunkering station for containing the natural gas, wherein the at least one natural gas tank is disposed beneath the deck and under the superstructure, beneath the deck, or in the superstructure, and wherein a volume of the at least one natural gas tank ranges from one hundred cubic meters to twelve hundred cubic meters;
   f. a plurality of diesel fuel storage tanks for containing portions of the diesel fuel, wherein each diesel fuel storage tank is mounted below the deck and connected to the bunkering station;
   g. a plurality of diesel fuel day tanks for containing portions of the diesel fuel, wherein each diesel fuel day tank is mounted above the deck and connected to the plurality of diesel fuel storage tanks, and wherein a volume of the plurality of diesel fuel day tanks and the plurality of diesel fuel storage tanks ranges from one hundred cubic meters to two thousand cubic meters; and
   h. a propulsion system connected to the at least one natural gas tank, the plurality of diesel fuel day tanks, and the navigation system, wherein the propulsion system is adapted to selectively switch between the at least one natural gas tank and the plurality of diesel fuel day tanks, and wherein the propulsion system comprises:
      (i) at least one dual fuel engine disposed on the deck, thereby maximizing cargo capacity within the hull, wherein the at least one dual fuel engine is configured to selectively operate on the natural gas or the diesel fuel;
      (ii) at least one electrical power supply disposed on the deck and connected to the at least one duel fuel engine;
      (iii) power transmission equipment connected to each electrical power supply; and
      (iv) at least one azimuthing thruster extending through the hull, wherein the at least one azimuthing thruster is powered by the power transmission equipment.

2. The small size floating vessel of claim 1, wherein the natural gas is a liquefied natural gas or a compressed natural gas, wherein the natural gas is:
   a. maintained at a pressure ranging from one atmosphere to eleven atmospheres;
   b. maintained at a temperature ranging from negative one hundred eighty degrees Celsius to negative one hundred fifty degrees Celsius; or
   c. maintained at a pressure ranging from one atmosphere to eleven atmospheres and maintained at a temperature ranging from negative one hundred eighty degrees Celsius to negative one hundred fifty degrees Celsius.

3. The small size floating vessel of claim 1, wherein the propulsion system comprises at least three electrical power supplies each connected with at least one dual fuel engine.

4. The small size floating vessel of claim 1, wherein the hull comprises a stern that is tapered and configured to rise from a waterline.

5. The small size floating vessel of claim 1, further comprising a bulbous bow on the hull.

6. The small size floating vessel of claim 1, further comprising:
   a. a global positioning system connected to the navigation system; and
   b. a processor with a data storage connected to the global positioning system, wherein the data storage comprises:
      (i) computer instructions to compare an actual location of the small size floating vessel as determined by the global positioning system to stored locations where emissions must be reduced, and to generate at least one alarm when the actual location is at a stored location where emissions must be reduced; and
      (ii) computer instructions to transmit the alarm to a client device to advise a captain to switch from diesel fuel to natural gas to minimize vessel emissions.

7. The small size floating vessel of claim 6, further comprising a dynamic positioning system connected to the global positioning system, laser reference systems, and acoustic reference systems for holding the small size floating vessel at one location, one heading, or combinations thereof.

8. A small size floating vessel having a dual fuel system, optimized cargo capacity, and options for selectively operating on diesel fuel and natural gas for maximizing economy of vessel operation and reducing vessel emissions of nitrogen oxides and particulates, wherein the small size floating vessel comprises:

a. a hull having an overall length ranging from sixty meters to one hundred seventy meters and a draft of up to ten meters;
b. a deck disposed over the hull;
c. a superstructure disposed over the deck for providing a navigation system and crew quarters;
d. a bunkering station disposed above or below the deck for bunkering natural gas and diesel fuel;
e. at least one natural gas tank connected to the bunkering station for containing the natural gas, wherein a volume of the at least one natural gas tank ranges from one hundred cubic meters to twelve hundred cubic meters;
f. a plurality of diesel fuel storage tanks for containing a portion of the diesel fuel, wherein the plurality of diesel fuel storage tanks are mounted below the deck and connected to the bunkering station;
g. a plurality of diesel fuel day tanks for containing a portion of the diesel fuel, wherein the plurality of diesel fuel day tanks are mounted above the deck and connected to the plurality of diesel fuel storage tanks, and wherein a volume of the diesel fuel day tanks and the diesel fuel storage tanks ranges from one hundred cubic meters to two thousand cubic meters; and
h. a propulsion system connected to the at least one natural gas tank, the plurality of diesel fuel day tanks, and the navigation system, wherein the propulsion system is adapted to selectively switch between the at least one natural gas tank and the diesel fuel day tanks, and wherein the propulsion system comprises:
(i) at least one dual fuel engine disposed on the deck, thereby maximizing cargo capacity within the hull while selectively operating on the natural gas or the diesel fuel;
(ii) at least one electrical power supply disposed on the deck and connected to the at least one duel fuel engine;
(iii) power transmission equipment connected to each electrical power supply; and
(iv) at least one azimuthing thruster extending through the hull and powered by the power transmission equipment.

9. The small sized floating vessel of claim 8, wherein the at least one natural gas tank is disposed: within the superstructure and above the deck, beneath the deck, or beneath the deck and under the superstructure.

10. The small size floating vessel of claim 8, wherein the natural gas is a liquefied natural gas or a compressed natural gas, wherein the natural gas is:
a. maintained at a pressure ranging from one atmosphere to eleven atmospheres;
b. maintained at a temperature ranging from negative one hundred eighty degrees Celsius to negative one hundred fifty degrees Celsius; or
c. maintained at a pressure ranging from one atmosphere to eleven atmospheres and maintained at a temperature ranging from negative one hundred eighty degrees Celsius to negative one hundred fifty degrees Celsius.

11. The small size floating vessel of claim 8, wherein the propulsion system comprises at least three electrical power supplies each connected with at least one dual fuel engine.

12. The small size floating vessel of claim 8, wherein the hull comprises a stern that is tapered and configured to rise from a waterline.

13. The small size floating vessel of claim 8, further comprising a bulbous bow on the hull.

14. The small size floating vessel of claim 8, further comprising:

a. a global positioning system connected to the navigation system; and
b. a processor with a data storage connected to the global positioning system, wherein the data storage comprises:
(i) computer instructions to compare an actual location of the small size floating vessel as determined by the global positioning system to stored locations where emissions must be reduced, and to generate at least one alarm when the actual location is at a stored location where emissions must be reduced; and
(ii) computer instructions to transmit the alarm to a client device to advise a captain to switch from diesel fuel to natural gas to minimize vessel emissions.

15. A floating vessel having a dual fuel system, optimized cargo capacity, and options for selectively operating on diesel fuel and natural gas for maximizing economy of vessel operation and reducing vessel emissions of nitrogen oxides and particulates, wherein the floating vessel comprises:

a. a hull;
b. a deck disposed over the hull;
c. a superstructure disposed over the deck for providing a navigation system and crew quarters;
d. a bunkering station disposed above or below the deck for bunkering natural gas and diesel fuel;
e. at least one natural gas tank connected with the bunkering station for containing the natural gas;
f. a plurality of diesel fuel storage tanks for containing a portion of the diesel fuel, wherein the plurality of diesel fuel storage tanks are mounted below the deck and connected to the bunkering station;
g. a plurality of diesel fuel day tanks for containing a portion of the diesel fuel, wherein the plurality of diesel fuel day tanks are mounted above the deck and connected to the plurality of diesel fuel storage tanks; and
h. a propulsion system connected to the at least one natural gas tank, the plurality of diesel fuel day tanks, and the navigation system, wherein the propulsion system is adapted to selectively switch between the at least one natural gas tank and the plurality of diesel fuel day tanks, and wherein the propulsion system comprises:
(i) at least one dual fuel engine disposed on the deck, thereby maximizing cargo capacity within the hull while selectively operating on either the natural gas or the diesel fuel;
(ii) at least one electrical power supply disposed on the deck and connected to the at least one duel fuel engine;
(iii) power transmission equipment connected to each electrical power supply; and
(iv) at least one azimuthing thruster extending through the hull and powered by the power transmission equipment.

16. The floating vessel of claim 15, wherein the at least one natural gas tank is disposed: within the superstructure and above the deck, beneath the deck, or beneath the deck and under the superstructure.

17. The small size floating vessel of claim 15, wherein the natural gas is a liquefied natural gas or a compressed natural gas, wherein the natural gas is:
a. maintained at a pressure ranging from one atmosphere to eleven atmospheres;
b. maintained at a temperature ranging from negative one hundred eighty degrees Celsius to negative one hundred fifty degrees Celsius; or
c. maintained at a pressure ranging from one atmosphere to eleven atmospheres and maintained at a temperature ranging from negative one hundred eighty degrees Celsius to negative one hundred fifty degrees Celsius.

18. The floating vessel of claim 15, wherein the hull comprises a stern that is tapered and configured to rise from a waterline.

19. The floating vessel of claim 15, further comprising a bulbous bow on the hull.

20. The floating vessel of claim 15, further comprising:
   a. a global positioning system connected to the navigation system; and
   b. a processor with a data storage connected to the global positioning system, wherein the data storage comprises:
      (i) computer instructions to compare an actual location of the small size floating vessel as determined by the global positioning system to stored locations where emissions must be reduced, and to generate at least one alarm when the actual location is at a stored location where emissions must be reduced; and
      (ii) computer instructions to transmit the alarm to a client device to advise a captain to switch from diesel fuel to natural gas to minimize vessel emissions.

* * * * *

UNITED STATES PATENT AND TRADEMARK OFFICE
CERTIFICATE OF CORRECTION

| | | |
|---|---|---|
| PATENT NO. | : 8,690,622 B2 | Page 1 of 1 |
| APPLICATION NO. | : 13/231742 | |
| DATED | : April 8, 2014 | |
| INVENTOR(S) | : Ronald C. Pearson et al. | |

It is certified that error appears in the above-identified patent and that said Letters Patent is hereby corrected as shown below:

TITLE PAGE: ITEM 75 should read

Ronald C. Pearson, Houston, TX (US); Michael T. Carroll, Houston, TX (US); Chad J. Verret, Houston, TX (US)

Signed and Sealed this

Seventeenth Day of March, 2015

Michelle K. Lee
*Director of the United States Patent and Trademark Office*